US006589114B2

(12) United States Patent
Rose

(10) Patent No.: US 6,589,114 B2
(45) Date of Patent: Jul. 8, 2003

(54) SHUFFLE FEATURE FOR A GAME OF CHANCE

(75) Inventor: Bradley A. Rose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 69 days.

(21) Appl. No.: 09/912,966

(22) Filed: Jul. 25, 2001

(65) Prior Publication Data

US 2003/0027623 A1 Feb. 6, 2003

(51) Int. Cl.[7] .................................................. A63F 13/00
(52) U.S. Cl. ............................................ 463/20; 463/10
(58) Field of Search .............................. 463/20, 16, 30, 463/31, 9–13; 273/138.1

(56) References Cited

U.S. PATENT DOCUMENTS 5,980,384 A * 11/1999 Barrie ......................... 463/16

FOREIGN PATENT DOCUMENTS

| | | | | |
|---|---|---|---|---|
| EP | 1083531 A1 | | 3/2001 | ........... G07F/17/32 |
| GB | 2068619 A | * | 12/1981 | |
| GB | 2097160 A | | 10/1982 | ........... G07F/17/34 |

OTHER PUBLICATIONS

Brochure for “Who Dunnit”, WMS Gaming Inc., Chicago, IL, 2 pages, undated.
Brochure for “Perfect Game”, WMS Gaming Inc., Chicago, Il, 2 pages, undated.

Brochure for “Yukon Gold”, WMS Gaming Inc., Chicago, Il, 2 pages, undated.

Brochure for “Chairman of the Board”, WMS Gaming Inc., Chicago, Il, 2 pages, undated.

Brochure for “Chairman of the Board Wild”, WMS Gaming Inc., Chicago, Il, 2 pages, undated.

Brochure for “Jumble”, WMS Gaming Inc., Chicago, Il, 6 pages, undated.

Brochure for “Swingin’ in the Green”, WMS Gaming Inc., Chicago, Il, 2 pages, undated.

Product Sheet, “Loaded Dice”, Konami Gaming, Las Vegas, Nevada, 2000.

* cited by examiner

*Primary Examiner*—Henry C. Yuen
*Assistant Examiner*—Arnold Castro

(57) ABSTRACT

A game of chance is conducted on a video gaming machine controlled by a processor in response to a wager. The game includes a plurality of symbols randomly selected for placement in a displayed symbol array. A shuffle feature is triggered in response to the displayed symbols including a sequence of value-based symbols. The sequence defines a first award. The sequence of value-based symbols are then re-ordered such that the re-ordered sequence defines a second award. The second award is awarded to the player.

13 Claims, 7 Drawing Sheets

SHUFFLE FEATURE FOR A GAME OF CHANCE

FIELD OF THE INVENTION

The present invention relates generally to games of chance conducted on gaming machines and, more particularly, to a shuffle feature for a game of chance.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features and themes for bonus games to satisfy the demands of players and operators. Preferably, such new bonus game features and themes will maintain, or even further enhance, the level of player excitement offered by bonus games heretofore known in the art. The present invention is directed to satisfying these needs.

SUMMARY OF THE INVENTION

A game of chance is conducted on a video gaming machine controlled by a processor in response to a wager. The game includes a plurality of symbols randomly selected for placement in a displayed symbol array. A shuffle feature is triggered in response to the displayed symbols including a sequence of value-based symbols. The sequence defines a first award. The sequence of value-based symbols are then re-ordered such that the re-ordered sequence defines a second award. The second award is awarded to the player.

BRIEF DESCRIPTION OF THE DRAWINGS

The foregoing and other advantages of the invention will become apparent upon reading the following detailed description and upon reference to the drawings in which.

Figure 1:
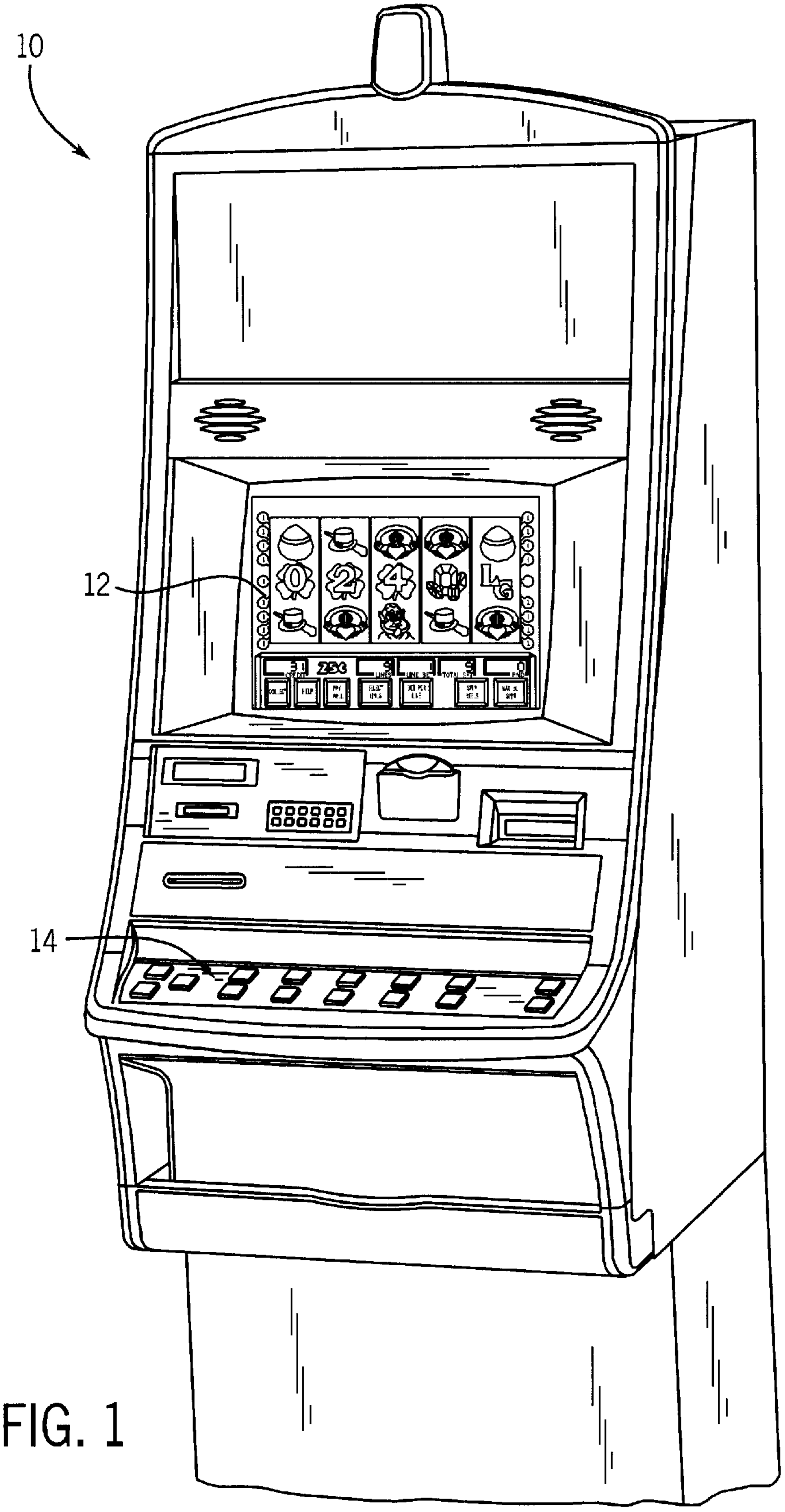
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 is operable to play a game of chance having a luck-of-the-Irish theme. The game of chance features a basic slot game with five simulated spinning reels and a special shuffle feature triggered by a start-feature outcome in the basic slot game. In addition to the shuffle feature, the basic slot game may produce certain outcomes for triggering other special features and bonus games. The gaming machine 10 includes a visual display 12 preferably in the form of a dot matrix, CRT, LED, LCD, electro-luminescent, or other type of video display known in the art. The display 12 preferably includes a touch screen overlaying the monitor. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
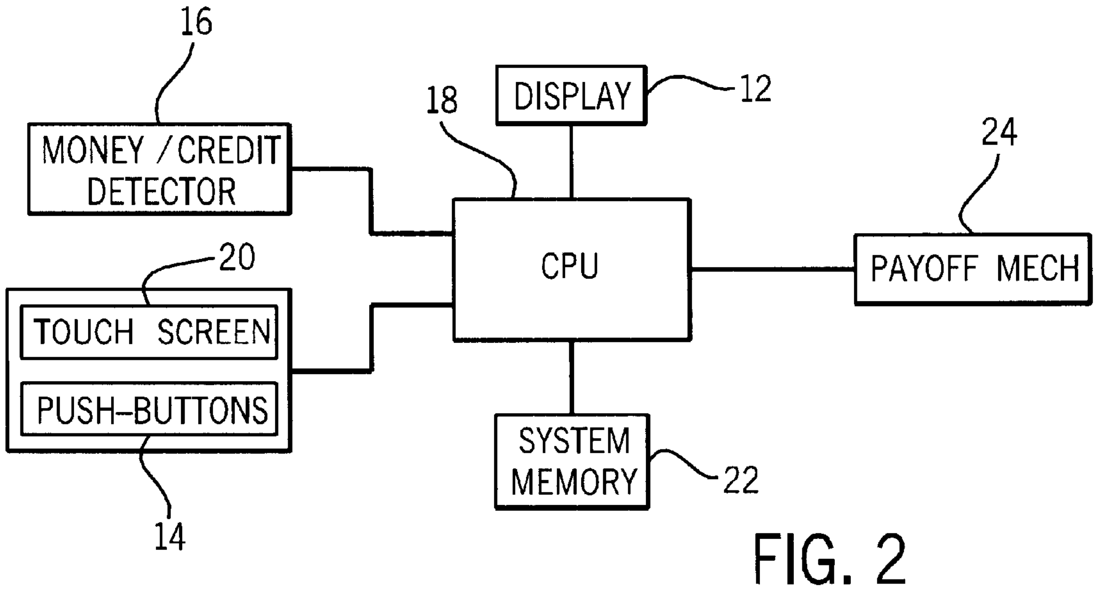
FIG. 2 is a block diagram of a control system suitable for operating the gaming machine.

FIG. 2 is a block diagram of a control system suitable for operating the gaming machine 10. Money/credit detector 16 signals a central processing unit ("CPU") 18 when a player has inserted money or played a number of credits. The money may be provided by coins, bills, tickets, coupons, cards, etc. Then, the CPU 18 operates to execute a game program that causes the display 12 to display five simulated symbol-bearing reels. The player may select a number of pay lines to play, an amount to wager, and start game play via the touch screen 20 or the push-buttons 14, causing the CPU 18 to set the reels in motion, randomly select a game outcome, and then stop the reels to display symbols corresponding to the pre-selected game outcome. In one embodiment, one of the basic game outcomes triggers a special shuffle feature.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or shuffle feature. The payoff may be provided in the form of coins, bills, tickets, coupons, cards, etc. The payoff amounts are determined by one or more pay tables stored in the system memory 22.

Figure 3:
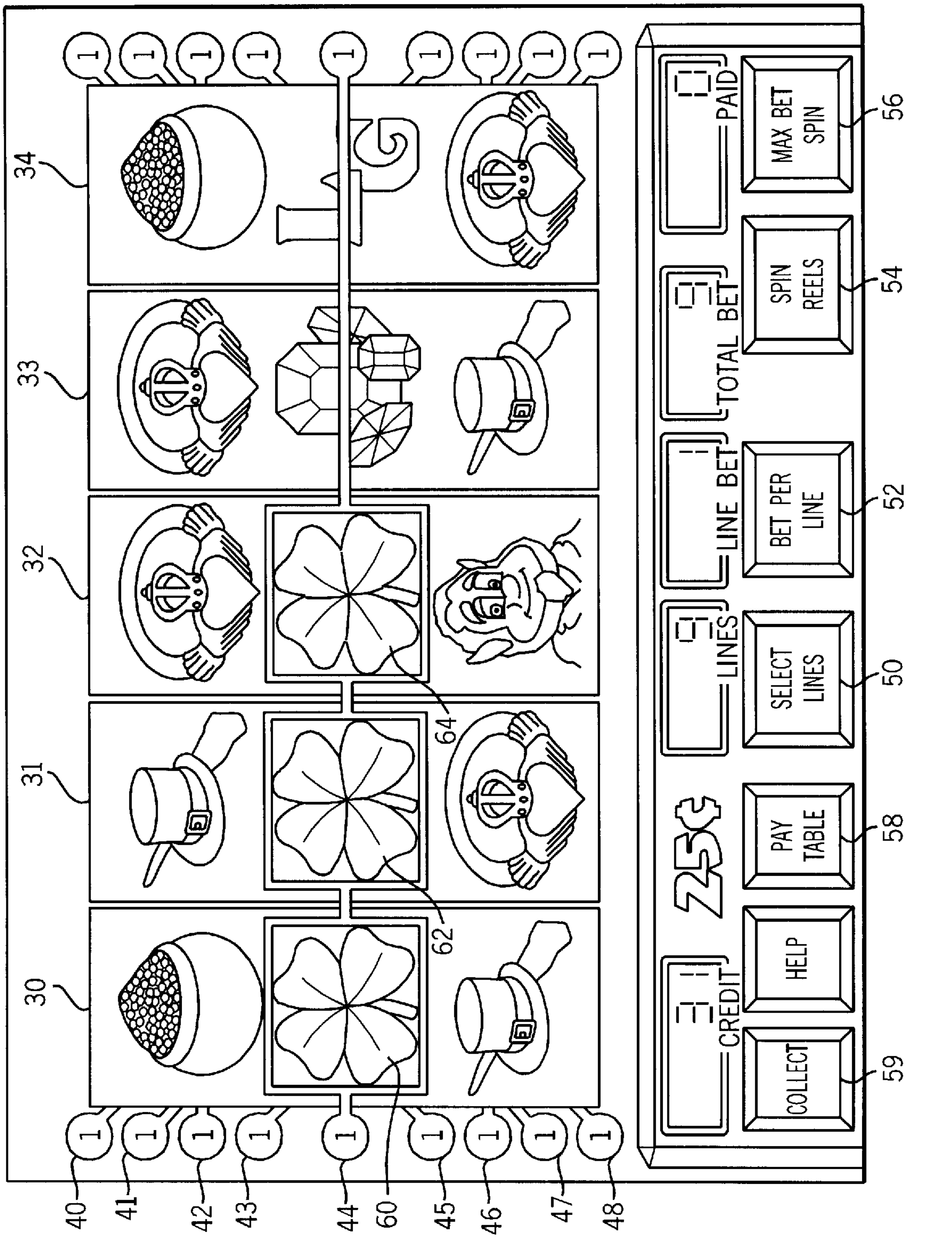
FIG. 3 is a display screen capture associated with a basic slot game and showing a symbol combination for triggering a special shuffle feature.

Referring to FIG. 3, the basic game is implemented on the display 12 on five video simulated spinning reels 30–34 with nine pay lines 40–48. Each of the pay lines 40–48 extends through one symbol on each of the five reels 30–34. Generally, game play is initiated by inserting money or playing a number of credits, causing the CPU to activate a number of pay lines corresponding to the amount of money or number of credits played. In one embodiment, the player selects the number of pay lines (between one and nine) to play by pressing a "Select Lines" key 50 on the video display 12. The player then chooses the number of coins or credits to bet on the selected pay lines by pressing the "Bet Per Line" key 52.

After activation of the pay lines, the reels 30–34 may be set in motion by touching the "Spin Reels" key 54 or, if the player wishes to bet the maximum amount per line, by using the "Max Bet Spin" key 56 on the video display 12. Alternatively, other mechanisms such as, for example, a lever or push button may be used to set the reels in motion. The CPU uses a random number generator to select a game outcome (e.g., "basic" game outcome) corresponding to a particular set of reel "stop positions." The CPU then causes each of the video reels 30–34 to stop at the appropriate stop position. Video symbols are displayed on the reels 30–34 to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30–34 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing the "Collect" button 59. In one implementation, the winning combinations start from the first reel 30 (left to right) and span adjacent reels. In an alternative implementation, the winning combinations start from either the first reel 30 (left to right) or the fifth reel 34 (right to left) and span adjacent reels.

Included among the plurality of basic game outcomes is a start-feature outcome for triggering play of a special shuffle feature. A start-feature outcome may be defined in any number of ways. For example, a start-feature outcome occurs when a special start-feature symbol or a special combination of symbols appears on one or more of the reels 30–34. The start-feature outcome may require the combination of symbols to appear along an active pay line, or may alternatively require that the combination of symbols appear anywhere on the display regardless of whether the symbols are along an active pay line. The appearance of a start-feature outcome causes the CPU to shift operation from the basic game to the shuffle feature of the present invention. In the embodiment illustrated in FIG. 3, three value-based SHAMROCK symbols 60, 62, and 64 along an active pay line on the respective first, second, and third reels 30, 31, and 32 trigger the shuffle feature.

Figure 4:
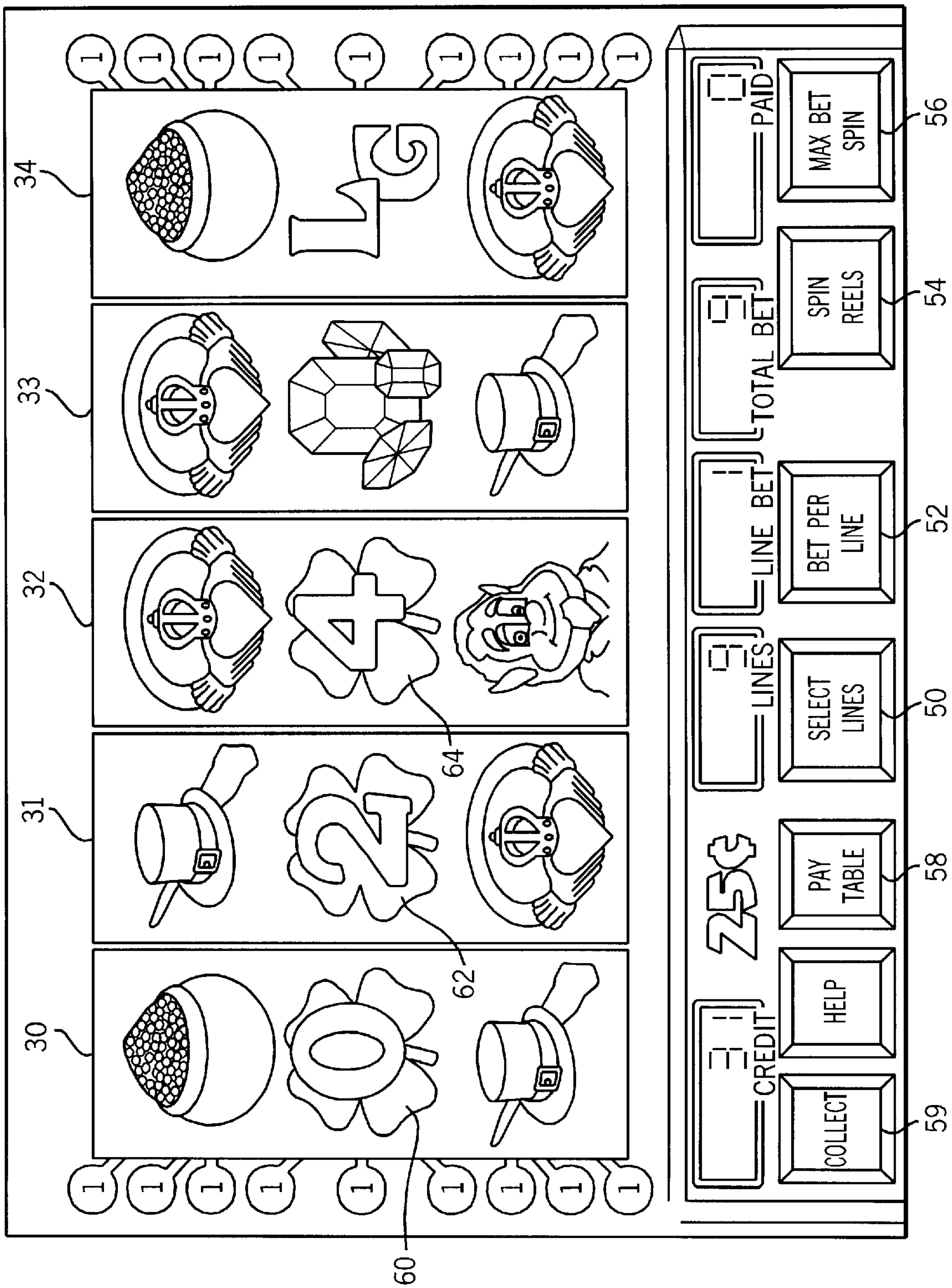
FIGS. 4 through 7 are display screen captures associated with the shuffle feature.

Referring to FIG. 4, in response to triggering the shuffle feature, the three SHAMROCK symbols 60, 62, and 64 animate to reveal respective numbers superimposed over the symbols. In the illustrated example, the SHAMROCK symbols 60, 62, and 64 have animated to reveal the respective numbers 0, 2, and 4. The revealed numbers 0, 2, and 4 represent respective digits of a three-digit credit amount, 024, that defines a first award. The credit amount is preferably the lowest possible credit amount formed by the three revealed numbers. The first award defined by the three-digit credit amount is not awarded to the player.

Figure 5:
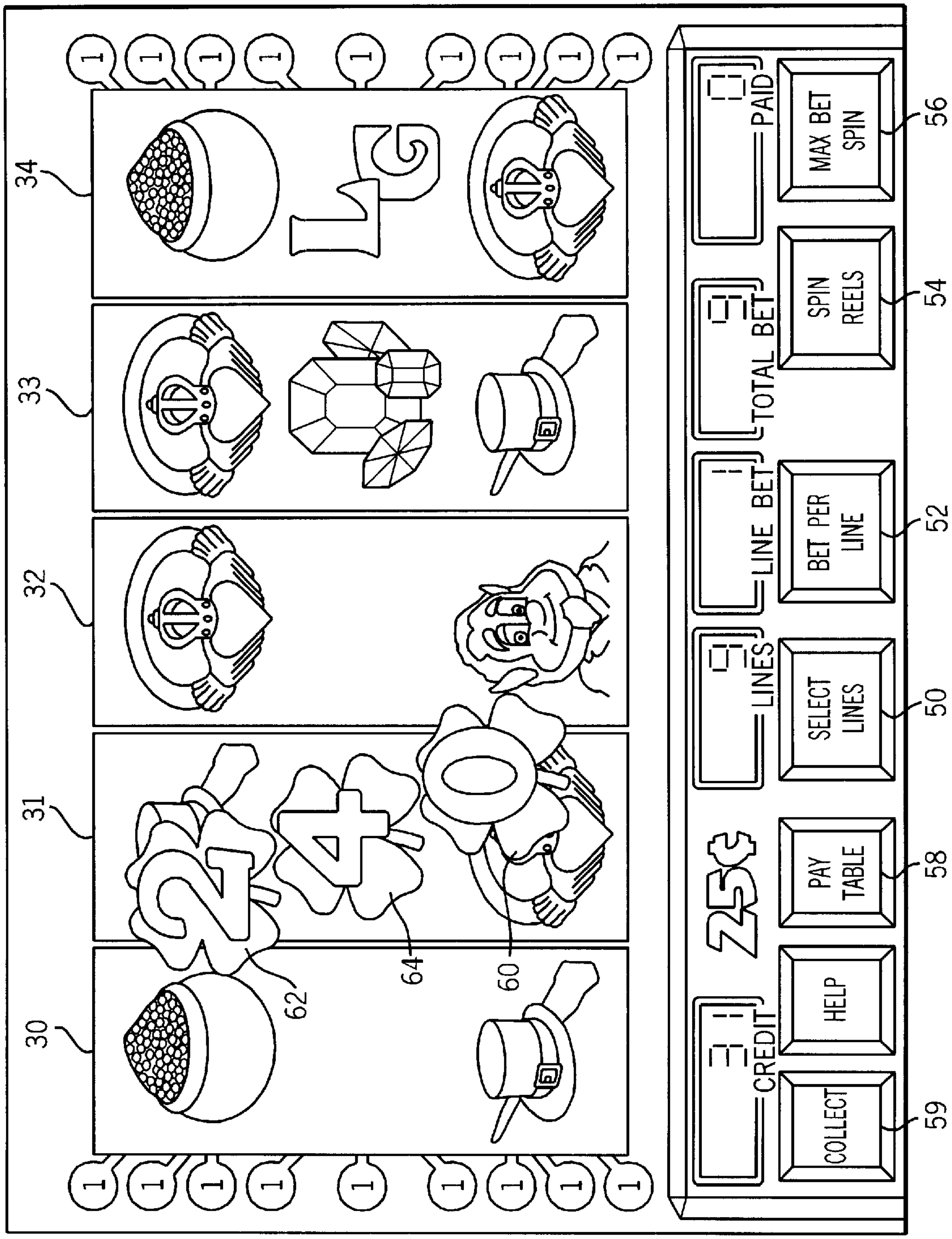
Figure 6:
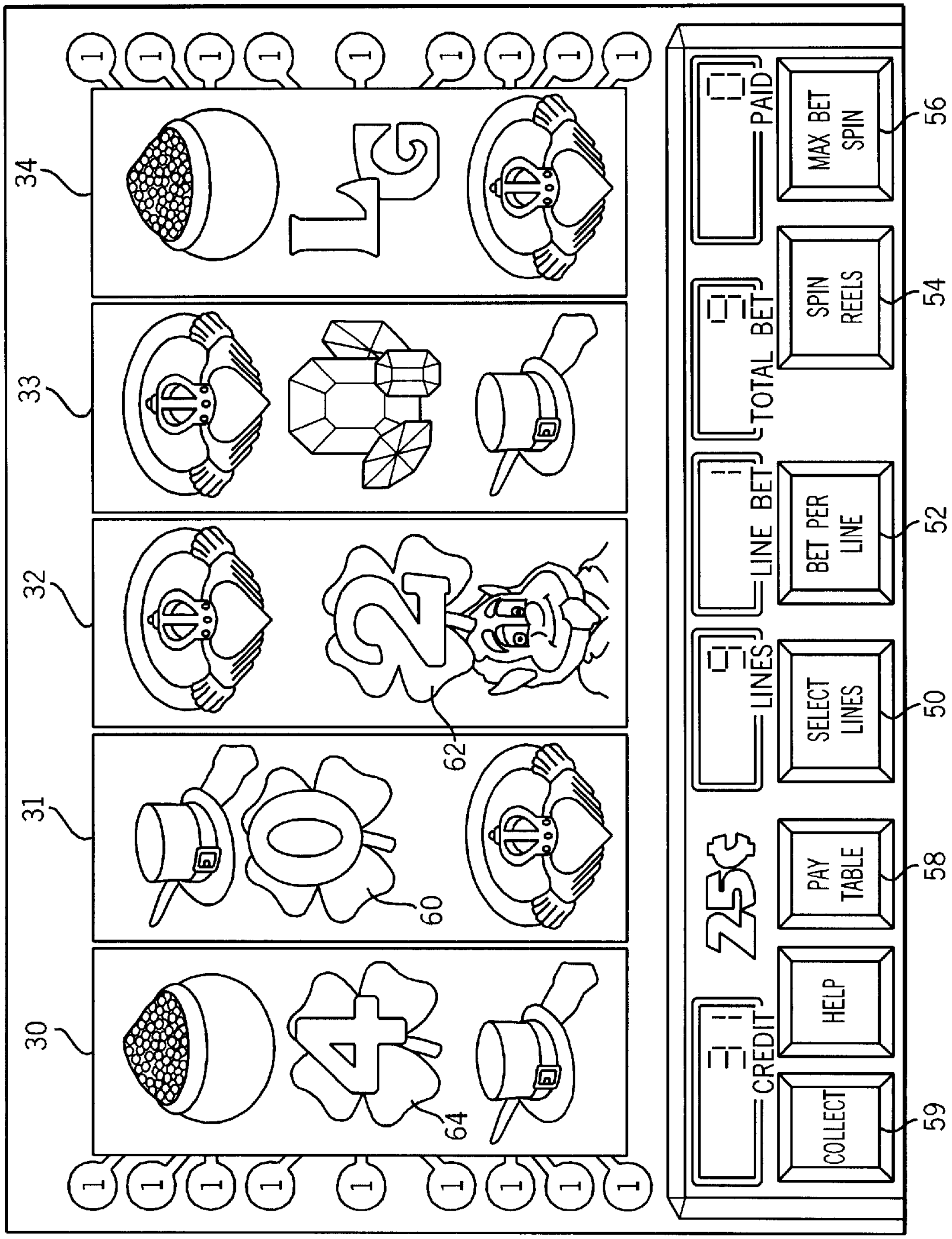
Figure 7:
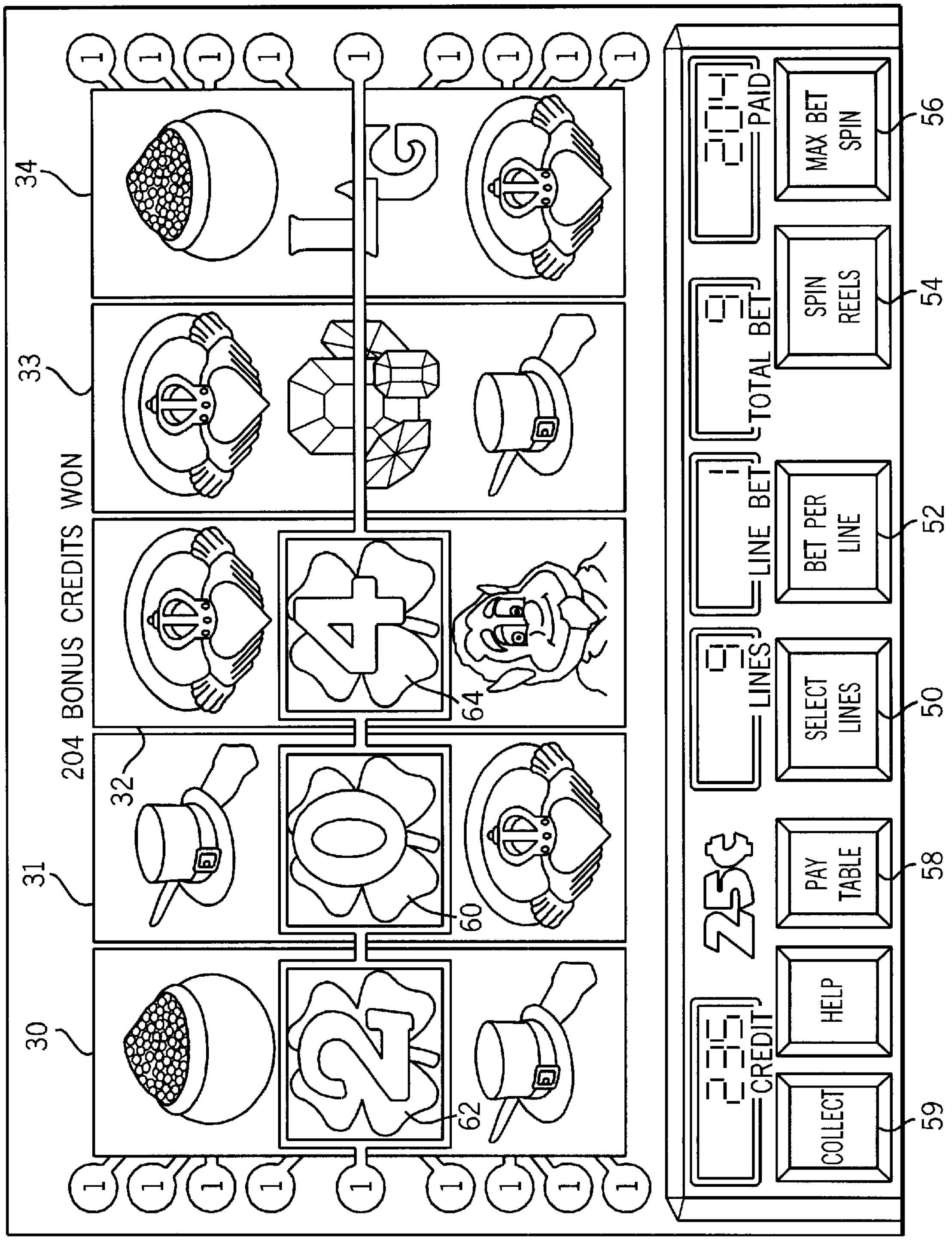

Rather, referring to FIGS. 5, 6, and 7, the three SHAMROCK symbols 60, 62, and 64 move off of their respective reels 30, 31, and 32, are randomly shuffled/re-ordered, and then moved back on to the reels. The numbers 0, 2, and 4 remain with the respective SHAMROCK symbols 60, 62, and 64 as the symbols are re-ordered such that the numbers are likewise re-ordered. The re-ordered SHAMROCK symbols 60, 62, and 64 are illustrated in FIG. 7, which shows the symbol 62 now on reel 30, the symbol 60 now on reel 31, and the symbol 64 now on reel 32. The re-ordered numbers 2, 0, and 4 represent respective digits of a new three-digit credit amount, 204, that defines a second award. The second award defined by the new three-digit credit amount is awarded to the player. The CPU then shifts operation from the shuffle feature back to the basic slot game.

Three numbers can be ordered to represent six possible credit amounts. The numbers 2, 0, and 4, for example, can be ordered to represent 024, 042, 204, 240, 402, and 420. When executing the shuffle feature, the CPU randomly selects one of the six possible credit amounts based on a probability table that is weighted to favor the smaller credits amounts over the higher credit amounts as follows:

| Credit Amount | Weight |
|---|---|
| B-M-S | 1 |
| B-S-M | 1 |
| M-B-S | 3 |
| M-S-B | 5 |
| S-B-M | 10 |
| S-M-B | 10 |

In the above table, "B" represents the biggest number (e.g., 4 in the example); "M" represents the middle number (e.g., 2 in the example); and "S" represents the smallest number (e.g., 0 in the example). The CPU then causes the three symbols 60, 62, and 64 to be re-ordered to show the randomly-selected credit amount. The weights applied to the different credit amounts may be varied from those shown in the above table. For example, in one alternative embodiment, the probability table equally weighs the credit amounts so that the probability of selecting each credit amount is one-sixth. In another alternative embodiment, the probability table is weighted to favor the higher credits amounts over the lower credit amounts.

While the present invention has been described with reference to one or more particular embodiments, those skilled in the art will recognize that many changes may be made thereto without departing from the spirit and scope of the present invention. For example, the sequence of value-based symbols for triggering the shuffle feature need not be in linear or horizontal alignment as illustrated in FIGS. 3 through 7, but rather may be in predefined vertical alignment or even a predefined non-linear or scatter arrangement. Also, the number of shuffled value-based symbols employed in the shuffle feature may be less than or greater than three so long as the ultimate credit amount awarded to the player allows the gaming machine to remain profitable. Further, the shuffle feature may be implemented as a "second-screen" feature in which the reels disappear and a new scene is presented to the player for a bonus round. The scene would include a sequence of value-based symbols that are randomly re-ordered, with or without player interaction, to define an award given to the player. Each of these embodiments and obvious variations thereof is contemplated as falling within the spirit and scope of the claimed invention, which is set forth in the following claims.

What is claimed is:

1. A method of conducting a game of chance on a gaming machine controlled by a processor, comprising:

receiving a wager from a player;

displaying a sequence of value-based symbols in a symbol array having multiple rows and columns, the sequence defining a first award;

re-ordering the sequence of value-based symbols in view of the symbol array such that the re-ordered sequence defines a second award; and awarding the second award to the player.

2. The method of claim 1, further including displaying a primary game including a plurality of possible randomly-selected outcomes, at least one of the possible outcomes being a start-feature outcome including the sequence of value-based symbols.

3. The method of claim 2, wherein the primary game includes a plurality of symbol-bearing reels that are rotated and stopped to place symbols on the reels in visual association with the symbol array, the symbols on the reels including the value-based symbols, the start-feature outcome including the sequence of value-based symbols aligned with each other in the symbol array.

4. The method of claim 1, wherein the sequence of value-based symbols includes at least three value-based symbols.

5. The method of claim 1, further including in response to displaying the sequence of value-based symbols, animating the sequence of value-based symbols to reveal respective numbers.

6. The method of claim 5, wherein the step of re-ordering the sequence of value-based symbols includes re-ordering the numbers associated with the respective value-based symbols, the re-ordered numbers being respective digits of a credit amount that defines the second award.

7. A method of conducting a game of chance on a gaming machine controlled by a processor, comprising:

receiving a wager from a player;

randomly selecting symbols for placement in a displayed symbol array including multiple rows and columns;

triggering a shuffle feature in response to the displayed symbols including a sequence of value-based symbols, the sequence defining a first award;

re-ordering the sequence of value-based symbols in view of the symbol array such that the re-ordered sequence defines a second award; and awarding the second award to the player.

8. The method of claim 7, wherein the step of triggering a shuffle feature is in response to the displayed symbols including the sequence of value-based symbols aligned with each other in the symbol array.

9. The method of claim 7, wherein the sequence of value-based symbols includes at least three value-based symbols.

10. The method of claim 7, further including animating the sequence of value-based symbols to reveal respective numbers.

11. The method of claim 10, wherein the step of re-ordering the sequence of value-based symbols includes re-ordering the numbers associated with the respective value-based symbols, the re-ordered numbers being respective digits of a credit amount that defines the second award.

12. A game of chance for a video gaming machine controlled by a processor in response to a wager, comprising:

means for displaying a sequence of value-based symbols in a symbol array having multiple rows and columns, the sequence defining a first award;

means for re-ordering the sequence of value-based symbols in view of the symbol array such that the re-ordered sequence defines a second award; and means for awarding the second award to the player.

13. A game of chance for a video gaming machine controlled by a processor in response to a wager, comprising:

means for randomly selecting symbols for placement in a displayed symbol array having multiple rows and columns;

means for triggering a shuffle feature in response to the displayed symbols including a sequence of value-based symbols, the sequence defining a first award;

means for re-ordering the sequence of value-based symbols in view of the symbol array such that the re-ordered sequence defines a second award; and means for awarding the second award to the player.

* * * * *